United States Patent
Buchholz et al.

(10) Patent No.: US 9,328,780 B2
(45) Date of Patent: May 3, 2016

(54) FLUID FRICTION CLUTCH
(71) Applicant: BorgWarner Inc., Auburn Hills, MI (US)
(72) Inventors: Thomas Buchholz, Stockach (DE); Frank Gerber, Markdorf (DE)
(73) Assignee: Borg Warner Inc., Auburn Hills, MI (US)
( * ) Notice: Subject to any disclaimer, the term of this patent is extended or adjusted under 35 U.S.C. 154(b) by 0 days.
(21) Appl. No.: 14/410,614
(22) PCT Filed: Jun. 24, 2013
(86) PCT No.: PCT/US2013/047238
§ 371 (c)(1),
(2) Date: Dec. 23, 2014
(87) PCT Pub. No.: WO2014/004338
PCT Pub. Date: Jan. 3, 2014
(65) Prior Publication Data
US 2015/0144452 A1 May 28, 2015
(30) Foreign Application Priority Data
Jun. 26, 2012 (EP) .................................... 12004767
(51) Int. Cl.
*F16D 35/02* (2006.01)
(52) U.S. Cl.
CPC ............ *F16D 35/022* (2013.01); *F16D 35/024* (2013.01)
(58) Field of Classification Search
CPC ..... F16D 35/02; F16D 35/021; F16D 35/023; F16D 35/024; F16D 35/022
See application file for complete search history.

(56) References Cited

U.S. PATENT DOCUMENTS

| 4,086,987 | A | 5/1978 | Riley et al. | |
|---|---|---|---|---|
| 4,278,157 | A | 7/1981 | King | |
| 4,667,791 | A | 5/1987 | Martin et al. | |
| 6,021,747 | A * | 2/2000 | Gee | F16D 35/024 123/41.11 |
| 6,032,775 | A * | 3/2000 | Martin | F16D 35/021 192/113.21 |
| 6,125,981 | A * | 10/2000 | Ito | F16D 35/026 192/58.61 |
| 6,581,742 | B2 | 6/2003 | Yamamoto | |
| 8,875,861 | B2 * | 11/2014 | Buchholz | F16D 35/02 192/58.61 |
| 2009/0127051 | A1 * | 5/2009 | Buchholz | F16D 35/024 192/58.2 |
| 2013/0313062 | A1 * | 11/2013 | Buchholz | F16D 35/027 192/58.7 |

FOREIGN PATENT DOCUMENTS

| EP | 0293102 | 11/1988 | |
| EP | 1731787 | 12/2006 | |
| WO | WO 2012/112283 A2 * | 8/2012 | ............ F16D 35/029 |

* cited by examiner

*Primary Examiner* — Richard Lorence
(74) *Attorney, Agent, or Firm* — Harness, Dickey & Pierce, P.L.C.; John Artz, PC (57) ABSTRACT

The invention relates to a fluid friction clutch (1) having a housing (2, 3) and a clutch disk (4), which is rotatable relative to the housing (2, 3), and which is rotatably arranged at one end (5) of a shaft (6) centrally supported inside the housing (2, 3), having a working chamber (9) between the housing (2, 3) and the clutch disk (4), having a storage chamber (10) for clutch fluid; and having a feed duct (11*a*, 11*b*), which leads from the storage chamber (10) to the working chamber (9), characterized by a supply pump element (14), which is rotatable relative to the housing (2, 3) and which is arranged, rotationally fixed, on the shaft (6), and which defines a shear gap (12) with the housing (2, 3); and by a valve (17), which is arranged in the feed duct (11), characterized in that an operative element (7) is arranged on the housing (2, 3).

26 Claims, 10 Drawing Sheets

FLUID FRICTION CLUTCH

CROSS-REFERENCE TO RELATED APPLICATIONS

This application is a national phase application based on PCT/US13/47238 filed Jun. 24, 2013, which claims priority from European Application No. 12004767.5, filed Jun. 26, 2012, the content of all of which is incorporated herein by reference in their entirety.

TECHNICAL FIELD

The present invention relates to viscous clutch fan drives and more particularly to systems for increasing the efficiency of such fan drives.

BACKGROUND

Such a fluid friction clutch is known from EP 1 731 787 B1, the disclosure of which is hereby made through explicit reference to the disclosure of the present application.

The object of the present invention is to create a fluid friction clutch of the type which affords a simple way of increasing the clutch efficiency.

SUMMARY OF THE INVENTION

The invention includes the provision of a rotatably supported supply pump element, which defines a shear gap with the housing, and using a differential speed between the pump element and the housing or the secondary side of the fluid friction clutch, and producing a volumetric flow from the storage chamber into the working chamber that varies as a function of the differential speed.

One of the particular advantages of the fluid friction clutch according to the invention firstly lies in the fact that only a small quantity of clutch fluid is required, since, owing to the arrangement previously explained, an active feed pump is formed in the oil reservoir, which is advantageous with regard to the quantity of clutch fluid compared to the known reliance on centrifugal forces for filling the working chamber.

The fluid friction clutch according to the invention moreover has a faster response characteristic due to the smaller proportion of clutch fluid.

Furthermore, an extremely compact construction results, since the outside diameter of the storage chamber or the reservoir can be made larger than the inside diameter of the working chamber.

To sum up, therefore, it can be established that an outstanding clutch performance can be achieved owing to the fact that the supply pump element rotates at primary speed (speed of the shaft) and skims off clutch fluid opposite the housing.

The dependent claims contain advantageous developments of the invention.

The clutch performance can be further improved by providing a return pump, which rotates at secondary or primary speed and skims off clutch fluid owing to its arrangement between the clutch disk and the housing.

BRIEF DESCRIPTION OF THE DRAWINGS

Further details, advantages and features of the present invention are set forth in the following description of exemplary embodiments, referring to the drawing, in which.

DESCRIPTION OF THE PREFERRED EMBODIMENTS

Figure 1A:
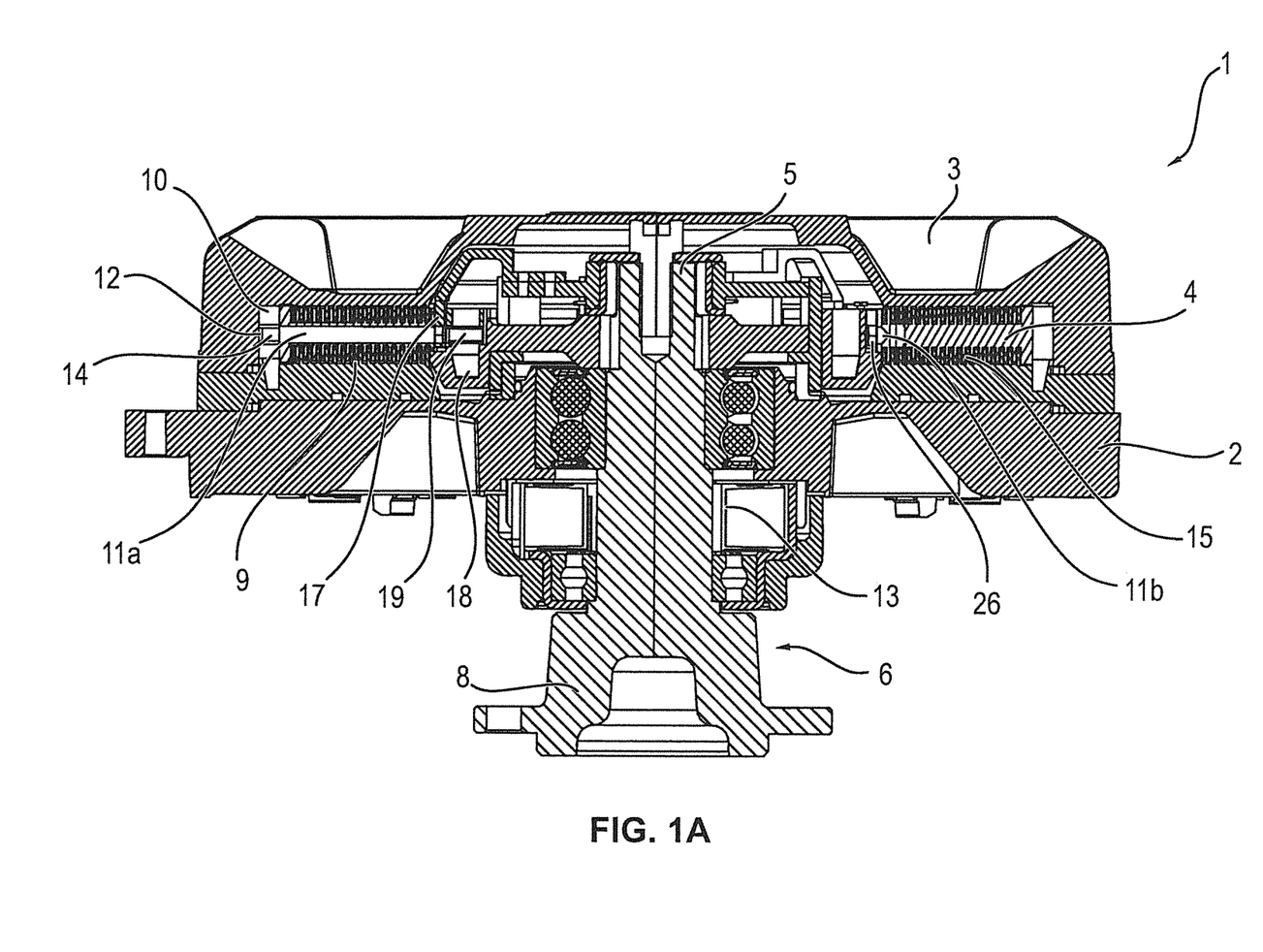
FIG. 1A shows a sectional representation of a fluid friction clutch according to the invention viewed from a first direction.
Figure 1B:
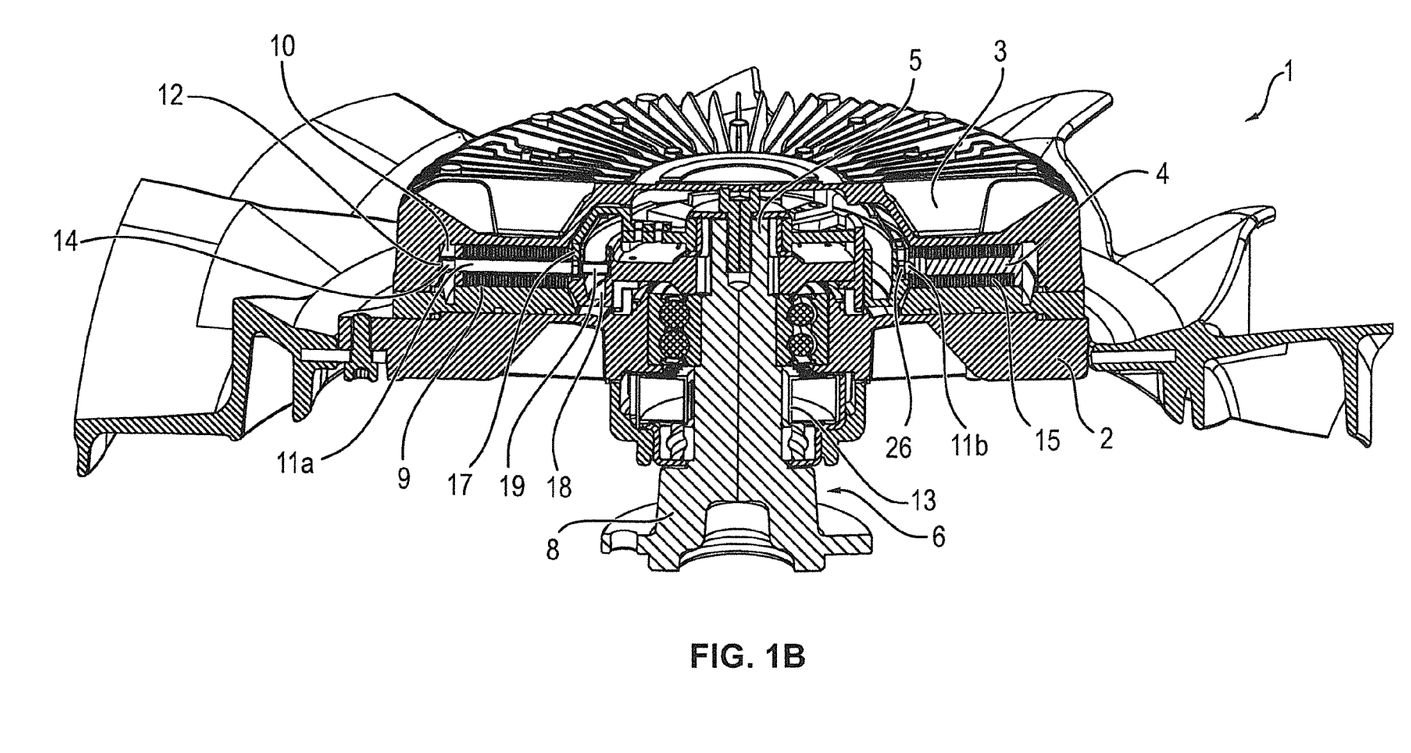
FIG. 1B shows a perspective, sectional representation of the fluid friction clutch according to FIG. 1A.
Figure 2A:
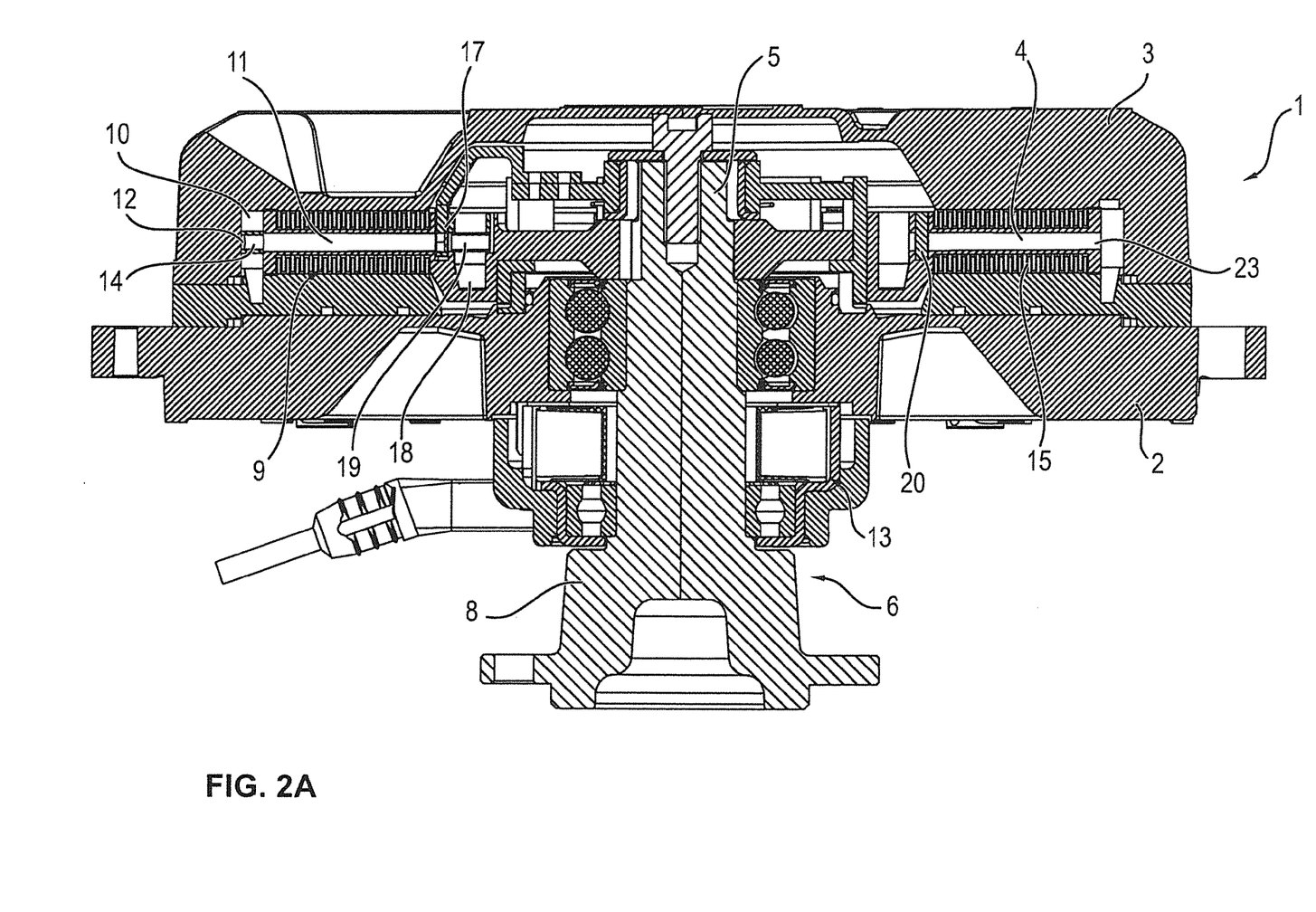
FIG. 2A shows a representation of the fluid friction clutch corresponding to FIG. 1A viewed from a second direction.
Figure 2B:
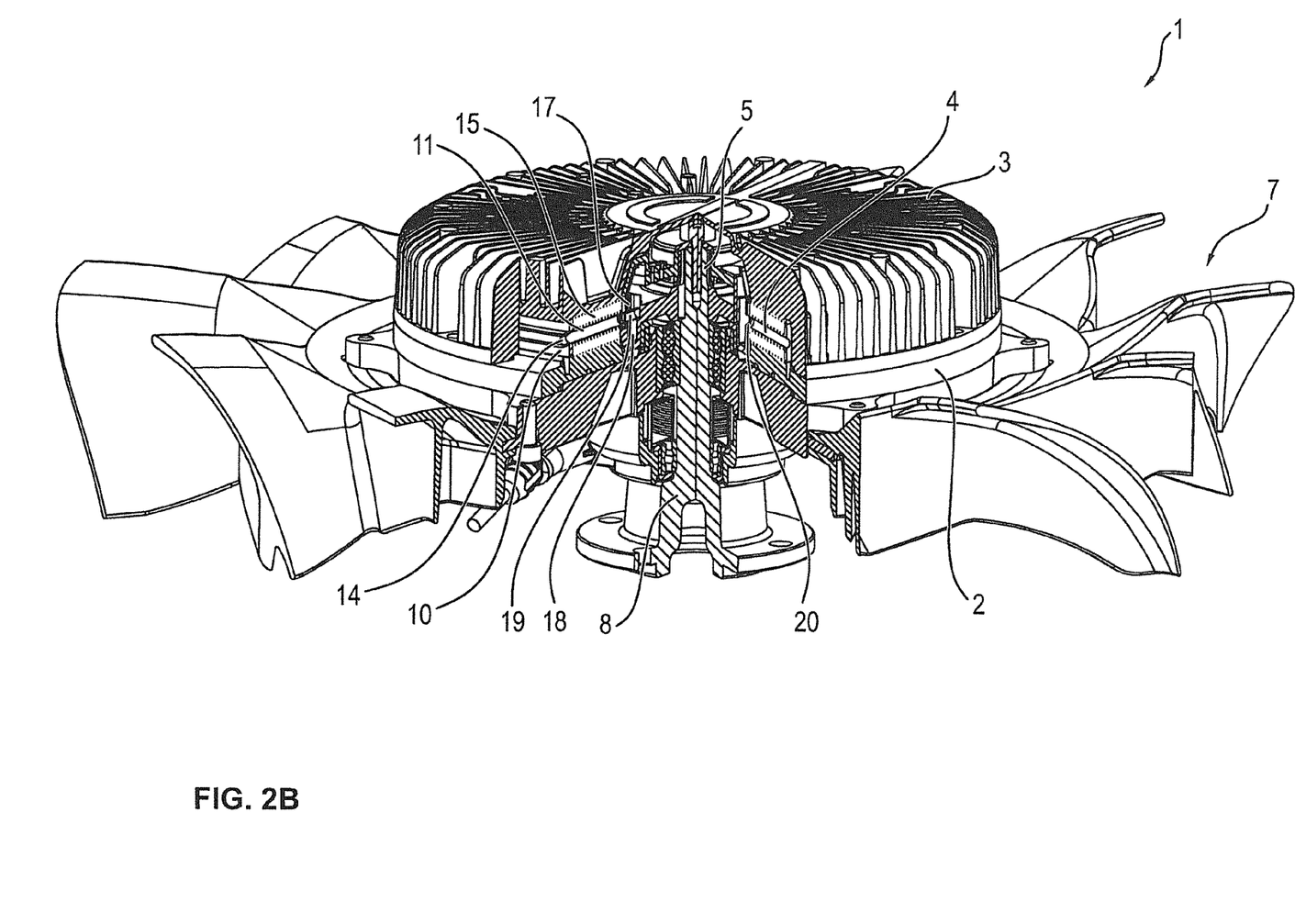
FIG. 2B shows a representation of the fluid friction clutch corresponding to FIG. 1B viewed from the direction according to FIG. 2A.

FIG. 1A shows a sectional representation of a fluid friction clutch 1 according to the invention, which comprises a housing, which is usually assembled from a housing body 2 and a cover 3.

A clutch disk 4, which is rotatable relative to the housing 2, 3, is arranged in the housing 2, 3. The clutch disk 4, rotatable relative to the housing 2, 3, is here arranged, rotationally fixed, at one end 5 of a shaft 6 centrally supported inside the housing 2, 3. A drivable operative element 7, represented in slightly simplified schematic form, which may be embodied as a fan wheel, for example, is fixed to the housing 2, 3.

A working chamber 9, which, as can be seen from FIG. 1A, comprises working gaps 15, which allow a transmission of the torque owing to a shear action on the clutch fluid fed to the working chamber 9, is arranged between the housing 2, 3 and the clutch disk 4.

A storage chamber 10 is provided for said clutch fluid, a feed duct 11a, 11b leading from the storage chamber 10 to the working chamber 9 and thereby forming the supply feed.

According to the invention, a return pumping system or a return pump 16 is furthermore provided, which serves for returning the clutch fluid from the working chamber 9 to the storage chamber 10. This return pump is formed either by the resulting centrifugal force, which pumps out fluid to the storage chamber 10 in order to evacuate the working chamber 9, or alternatively by the possible provision of a separate component in the form of an active return pump, as is indicated schematically in the hydraulics diagram in FIGS. 7 and 8, which acts through shearing force.

The fluid friction clutch 1 further comprises a stationary clutch part 13, which is rotatable relative to the housing 2, 3 and is preferably embodied as a magnet, in particular a solenoid.

As is apparent from the representation in FIGS. 1A, 1B, 2A and 2B and 4, an internal reservoir 18 is furthermore provided, which is connected to the storage chamber 10 by way of the feed duct 11. Here the vale 17 is inserted into the feed duct 11a, 11b and the storage chamber 10 is arranged outside, as can be seen in detail from FIGS. 1A to 2B.

A return flow barrier 19 is furthermore provided, which is arranged between the valve 17 and the reservoir 18. This return flow barrier 19 may be a small tube, for example, which projects above the fluid level into the reservoir 18.

As can also be seen from FIGS. 1A to 2B and 4 and 5, a return valve 20 is also provided, which is operatively connected to the valve 17 and opens or closes a return duct 23 to the storage chamber 10.

Figure 5:
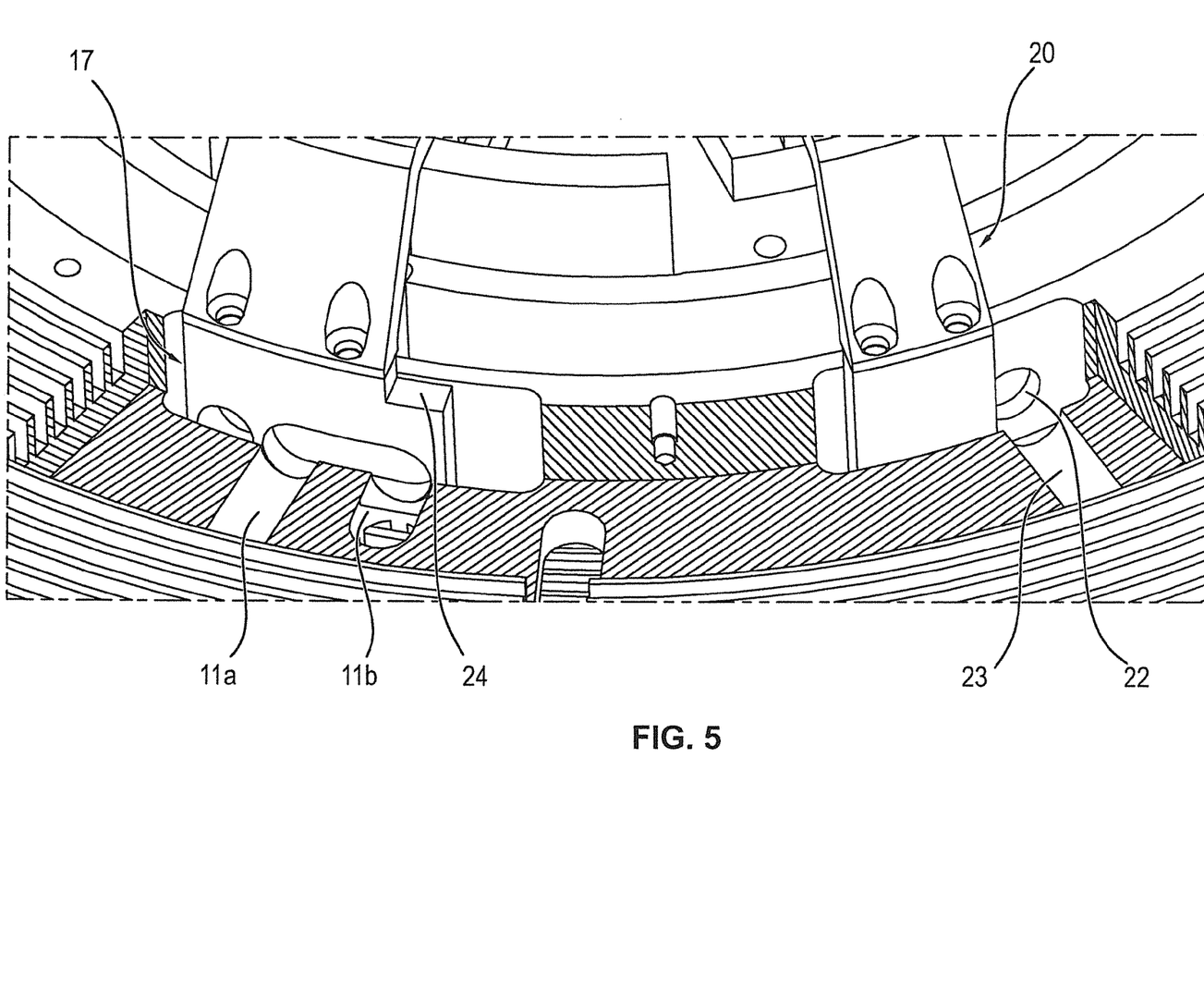
FIG. 5 shows a partial representation of another area of the fluid friction clutch corresponding to FIG. 4.
Figure 6:
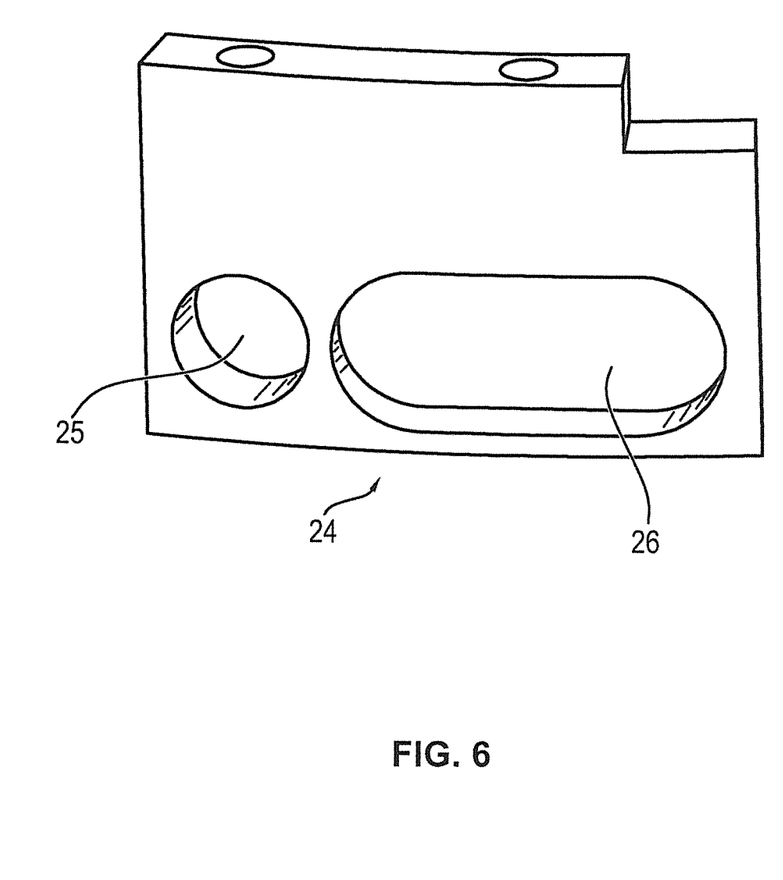
FIG. 6 shows a detailed presentation of a valve element represented in FIG. 5.

The valve 17, preferably embodied as a multiway valve, comprises a valve element 24, which has a passage 25 and a fluid inlet recess 26 for introducing fluid into the working chamber 9, which can be seen in particular from FIG. 5 and the detailed representation in FIG. 6.

Figure 3:
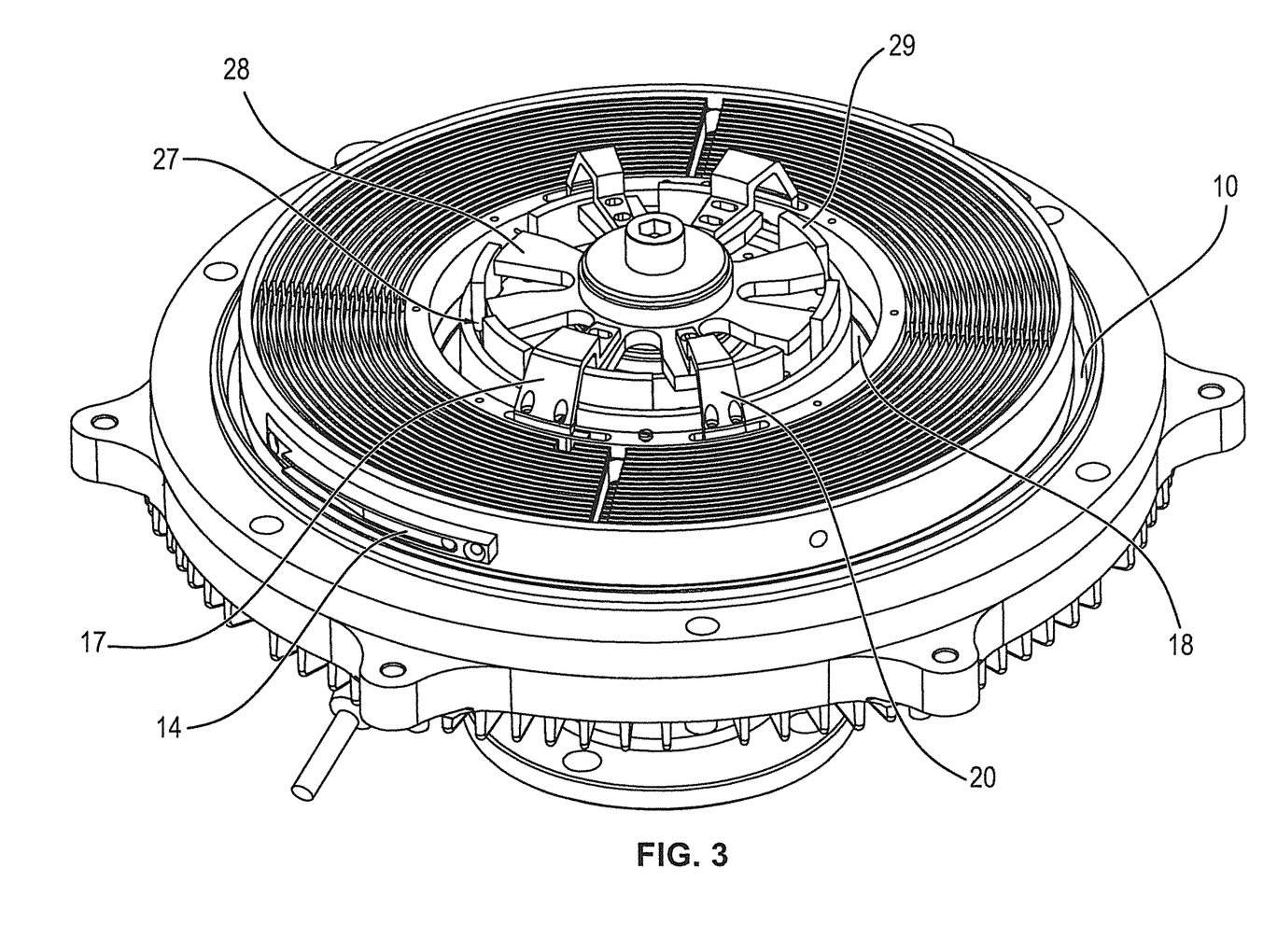
FIG. 3 shows a perspective top view of the fluid friction clutch without housing cover.
Figure 4:
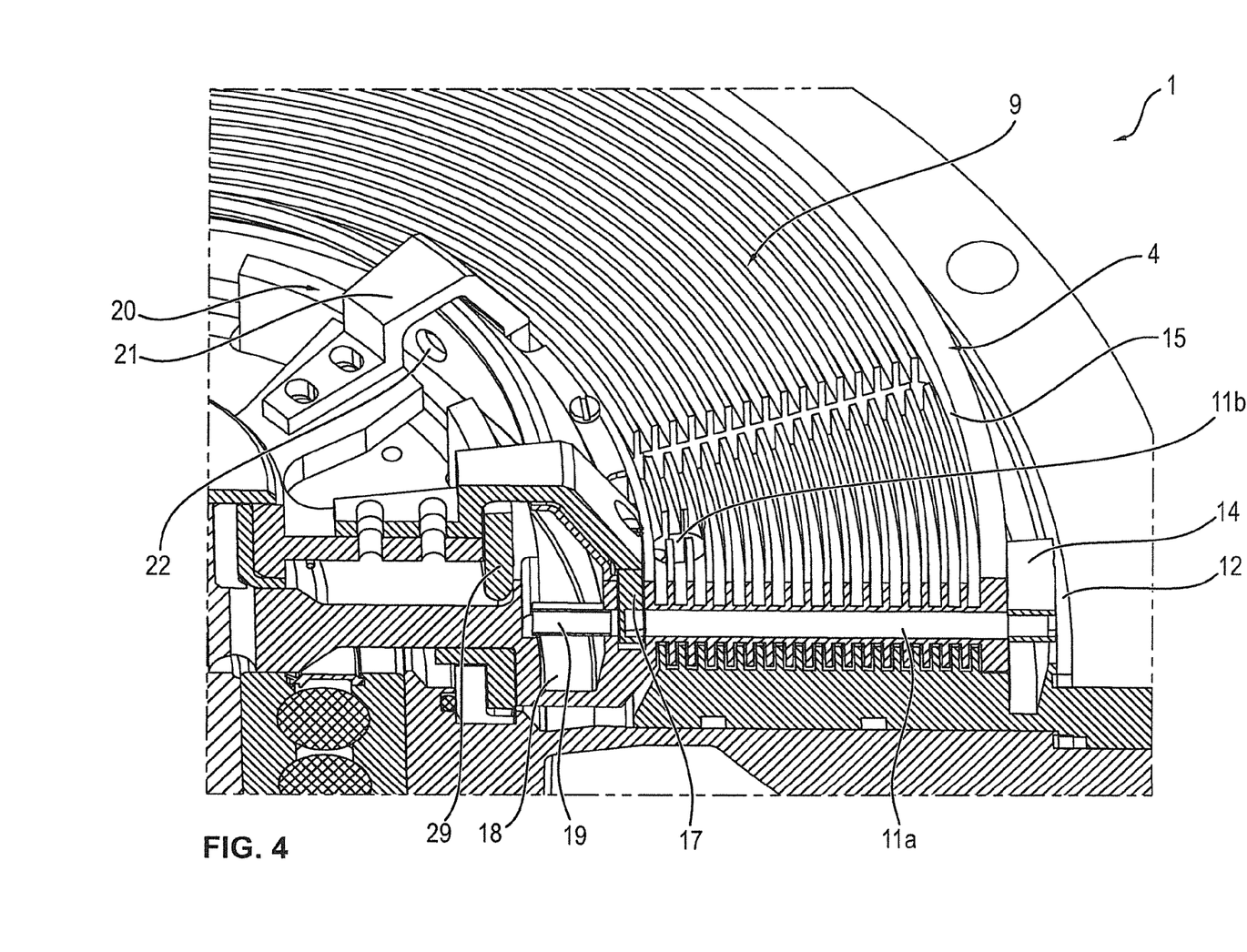
FIG. 4 shows a partial representation of the fluid friction clutch corresponding to FIG. 3.

An actuator 27 is furthermore provided for actuating the valve 17 and the return valve 20. The actuator 27 preferably comprises an armature 28, rotatable relative to the shaft 26 and a flux ring 29, which is rotatable with the shaft 6 and which can be excited by the stationary clutch part in the form of the magnet 13 (see FIG. 3).

The actuator 27 may also be moved by a bimetal strip (not shown) instead of the armature and the magnet.

In an especially preferred embodiment, the storage chamber 10 is provided on the secondary side of the fluid friction clutch 1 and the internal chamber 18 on the primary side of the fluid friction clutch 1.

Figure 7:
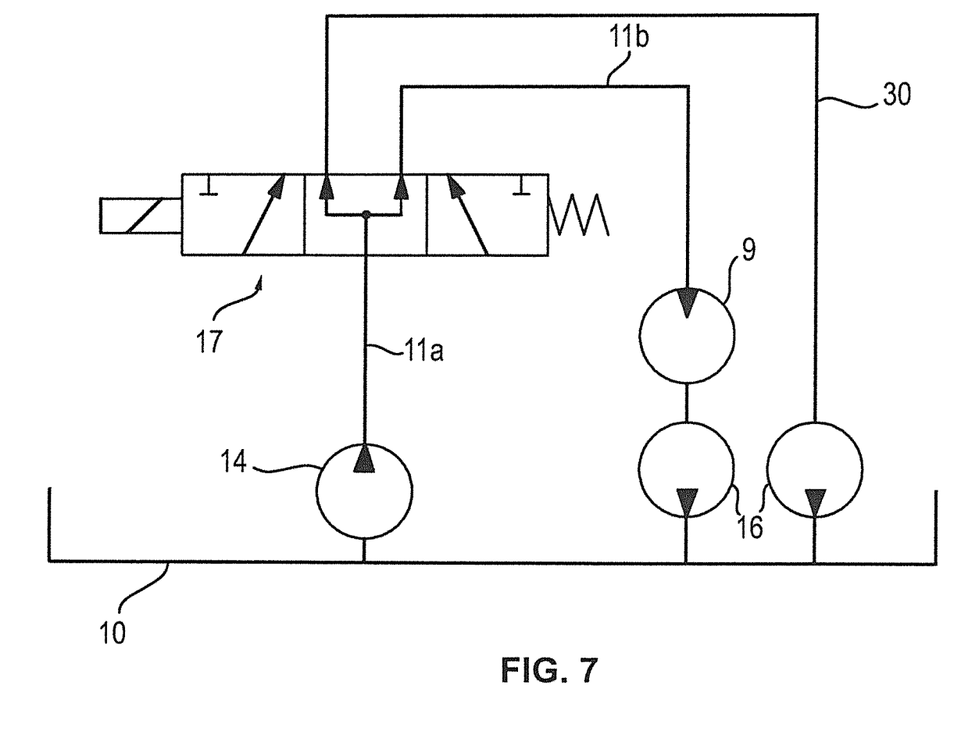
FIG. 7 shows a first embodiment of a hydraulic circuit diagram for the fluid friction clutch according to the invention.
Figure 8:
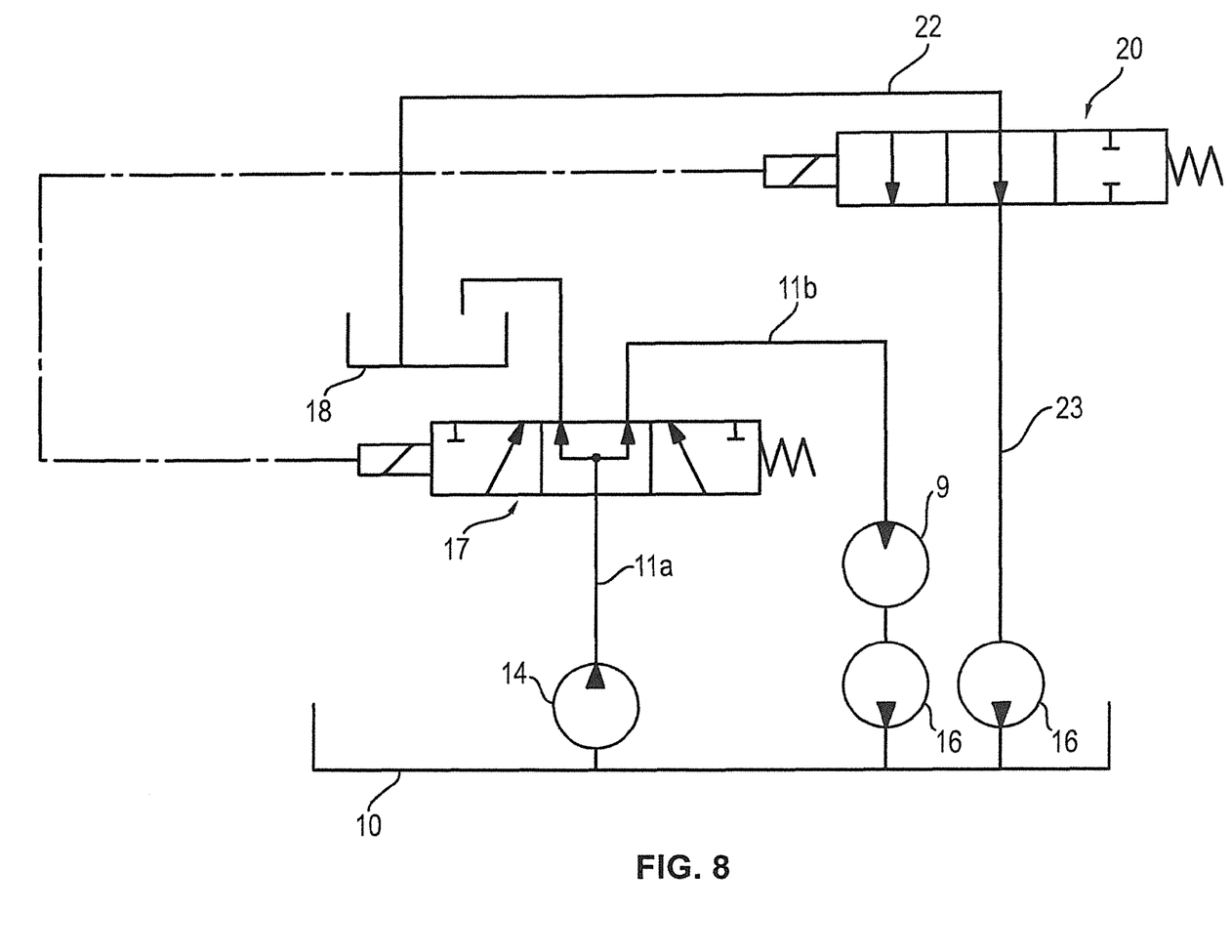
FIG. 8 shows a representation, corresponding to FIG. 3, of a second embodiment of the hydraulic circuit diagram for the fluid friction clutch according to the invention.

Finally, in an alternative embodiment according to FIG. 7, the fluid friction clutch 1 comprises a return bore 30 for the purpose of pressure relief, which connects the feed duct or the feed duct portion 11a to the storage chamber 10 by way of a further fluid inlet aperture (not shown) of the valve 17. In this embodiment, no internal volume is provided, so that the oil is not returned by way of the internal reservoir. This embodiment of the fluid friction clutch 1 according to the invention may be used in clutches of smaller design, which do not need an internal volume, since in these the drag torques are low.

In addition to the written disclosure of the invention above, explicit reference is hereby made to the graphic representation of the invention in FIGS. 1 to 4, intended to supplement the disclosure of the invention.

LIST OF REFERENCE NUMERALS 1 fluid friction clutch
2, 3 housing (2: housing body, 3: cover)
4 clutch disk
5 end of the shall 6
6 shaft
7 operative element (e.g. pinup impeller, fan wheel, etc.)
8 second end of the shall 6
9 working chamber
10 storage chamber
11a, 11b feed duct
12 shear gap
13 stationary clutch parts (magnet)
14 supply pump element
15 working gaps
16 return pump
17 valve
18 internal reservoir
19 return flow barrier
20 return valve
21 valve arm
22 connecting bore
23 return duct
24 valve element
25 passage
26 fluid inlet recess
27 actuator
28 armature
29 flux ring
30 return bore While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

The invention claimed is:

1. A fluid friction clutch (1)
having a housing (2, 3)
having a clutch disk (4),
   which is rotatable relative to the housing (2, 3), and
   which is arranged at one end (5) of a shaft (6) centrally supported inside the housing (2, 3),
having a working chamber (9) between the housing (2, 3) and the clutch disk (4);
having a storage chamber (10) for clutch fluid; and
having a feed duct (11a, 11b), which leads from the storage chamber (10) to the working chamber (9), characterized
by a supply pump element (14) which is rotatable relative to the housing (2, 3) and
   which is arranged, rotationally fixed, on the shaft (6), and
   which defines a shear gap (12) with the housing (2, 3); and
by a valve (17), which is arranged in the feed duct (11a, 11b), said valve being a multiway valve and characterized in
that an operative element (7) is arranged on the housing (2, 3).

2. The fluid friction clutch as claimed in claim 1, characterized in that a stationary clutch part (13) is provided, relative to which the housing (3) is rotatable.

3. The fluid friction clutch as claimed in claim 2, characterized by a return valve (20), which is operatively connected to the valve (17) and which opens and closes a return duct (23) to the storage chamber (10).

4. The fluid friction clutch as claimed in claim 3, characterized by an actuator (27) for actuating the valve (17) and the return valve (20).

5. The fluid friction clutch as claimed in claim 4, characterized in that the actuator (27) comprises an armature (28), rotatable relative to the shaft (6), and a flux ring (29), which is rotatable with the shaft (6) and which is excited by the stationary clutch part (13).

6. The fluid friction clutch as claimed in claim 4, characterized in that the actuator (27) can be moved by means of a bimetal strip arrangement.

7. The fluid friction clutch as claimed in claim 1, characterized by an internal reservoir (18), which is connected to the storage chamber (10) by way of the feed duct (11a, 11b) with insertion of the valve (17).

8. The fluid friction clutch as claimed in claim 7, characterized by a return flow barrier (19), which is arranged between the valve (17) and the reservoir (18).

9. The fluid friction clutch as claimed in claim 7, characterized in that the internal reservoir (18) is positioned in said housing and rotatable therewith.

10. The fluid friction clutch as claimed in claim 1, characterized in that the multiway valve (17) comprises a valve element (24), which has a passage (25) and a fluid inlet recess (26) for introducing fluid into the working chamber (9).

11. The fluid friction clutch as claimed in claim 1, characterized by a return pump (16) for returning clutch fluid from the working chamber (9) to the storage chamber (10).

12. The fluid friction clutch as claimed in claim 1, characterized in that the storage chamber (10) is rotatable relative to said housing.

13. The fluid friction clutch as claimed in claim 1, characterized by a return bore (30) for the purpose of pressure relief, which connects a feed duct portion (11a) of the feed duct (11a, 11b) to the storage chamber (10) by way of a further fluid inlet aperture of the valve (17).

14. A fluid friction clutch (1), comprising:
a housing (2, 3);
a clutch disk (4), said clutch disk rotatable relative to the housing (2, 3), and arranged at one end (5) of a shaft (6) centrally supported inside the housing (2, 3);
a working chamber (9) between the housing (2, 3) and the clutch disk (4);
a storage chamber (10) for clutch fluid;
a feed duct (11a, 11b), which leads from the storage chamber (10) to the working chamber (9);
a supply pump element (14) which is rotatable relative to the housing (2, 3); said supply pump element arranged, rotationally fixed, on the shaft (6), and defining shear gap (12) with the housing (2, 3);
a valve (17), which is arranged in the feed duct (11a, 11b), and characterized in that an operative element (7) is arranged on the housing (2, 3); and
a return bore (30) for the purpose of pressure relief, which connects a feed duct portion (11a) of the feed duct (11a, 11b) to the storage chamber (10) by way of a further fluid inlet aperture of the valve (17).

15. The fluid friction clutch as claimed in claim 14, characterized in that a stationary clutch part (13) is provided, relative to which the housing (3) is rotatable.

16. The fluid friction clutch as claimed in claim 15, characterized by a return valve (20), which is operatively connected to the valve (17) and which opens and closes a return duct (23) to the storage chamber (10).

17. The fluid friction clutch as claimed in claim 16, characterized by an actuator (27) for actuating the valve (17) and the return valve (20).

18. The fluid friction clutch as claimed in claim 17, characterized in that the actuator (27) comprises an armature (28), rotatable relative to the shaft (6), and a flux ring (29), which is rotatable with the shaft (6) and which is excited by the stationary clutch part (13).

19. The fluid friction clutch as claimed in claim 17, characterized in that the actuator (27) can be moved by means of a bimetal strip arrangement.

20. The fluid friction clutch as claimed in claim 14, characterized by an internal reservoir (18), which is connected to the storage chamber (10) by way of the feed duct (11a, 11b) with insertion of the valve (17).

21. The fluid friction clutch as claimed in claim 20, characterized by a return flow barrier (19), which is arranged between the valve (17) and the reservoir (18).

22. The fluid friction clutch as claimed in claim 20, characterized in that the internal reservoir (18) is positioned in said housing and rotatable therewith.

23. The fluid friction clutch as claimed in claim 14, characterized in that the valve (17) is a multiway valve.

24. The fluid friction clutch as claimed in claim 23, characterized in that the multiway valve (17) comprises a valve element (24), which has a passage (25) and a fluid inlet recess (26) for introducing fluid into the working chamber (9).

25. The fluid friction clutch as claimed in claim 14, characterized by a return pump (16) for returning clutch fluid from the working chamber (9) to the storage chamber (10).

26. The fluid friction clutch as claimed in claim 14, characterized in that the storage chamber (10) is rotatable relative to said housing.

* * * * *